United States Patent
Panda et al.

(10) Patent No.: US 10,824,493 B2
(45) Date of Patent: Nov. 3, 2020

(54) DISAMBIGUATION OF ERROR LOGGING DURING SYSTEM RESET

(71) Applicant: Intel Corporation, Santa Clara, CA (US)

(72) Inventors: Subhankar Panda, Portland, OR (US); Gaurav Porwal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 15/606,799

(22) Filed: May 26, 2017

(65) Prior Publication Data

US 2018/0341537 A1 Nov. 29, 2018

(51) Int. Cl.
*G06F 11/00* (2006.01)
*G06F 11/07* (2006.01)

(52) U.S. Cl.
CPC ...... *G06F 11/0766* (2013.01); *G06F 11/0787* (2013.01)

(58) Field of Classification Search
CPC ............. G06F 11/0766; G06F 11/0787; G06F 11/0703; G06F 11/0721; G06F 11/0724; G06F 11/0751; G06F 11/0772; G06F 11/0778; G06F 11/3003; G06F 11/3024; G06F 9/4401; G06F 9/4403; G06F 9/4405; G06F 9/445

USPC ............ 714/14, 30, E11.002, E11.004, 714/E11.022–E11.028
See application file for complete search history.

(56) References Cited

U.S. PATENT DOCUMENTS

| | | | |
|---|---|---|---|
| 6,415,394 B1 * | 7/2002 | Fruehling | G06F 11/27 714/30 |
| 6,421,790 B1 * | 7/2002 | Fruehling | G06F 11/1004 714/30 |
| 6,625,688 B1 * | 9/2003 | Fruehling | G06F 11/2236 711/109 |
| 10,671,465 B2 * | 6/2020 | Porwal | G06F 11/0793 |
| 2018/0150345 A1 * | 5/2018 | Porwal | G06F 11/079 |

* cited by examiner

*Primary Examiner* — Anthony J Amoroso
(74) *Attorney, Agent, or Firm* — Barnes & Thornburg LLP (57) ABSTRACT

A mechanism for disambiguation of error logging during a warm reset is disclosed. A system agent detects an error occurring during bootstrapping of a processor package. The error occurs prior to initiation of a machine check system. A wide pulse event is initiated to signal a wide pulse register to store a wide pulse time stamp counter value. The wide pulse event also signals a lap register to store a lap time stamp counter value. The wide pulse register maintains the wide pulse time stamp counter value during a warm reset, and the lap register clears the lap time stamp counter value during the warm reset. The system agent obtains the wide pulse time stamp counter value and the lap time stamp counter value after bootstrapping is complete to determine an order of occurrence of the error relative to the warm reset.

25 Claims, 6 Drawing Sheets

DISAMBIGUATION OF ERROR LOGGING DURING SYSTEM RESET

BACKGROUND

Complex computing environments can fail in an equally complex fashion. Various forms of error logging may be employed to support debugging and repair of such complex computing systems. However, error logs themselves may be difficult to interpret and even incomplete in many cases. For example, a bootstrapping sequence may include many operations that occur prior to initiation of an error management system. In such a case, errors occurring prior to the initiation of the error management system may not be captured. Further, a bootstrapping sequence may include multiple warm resets. The warm resets may serve as points to take corrective actions for errors. However, without useful error logging, the error management system may be unable to determine whether an error occurred before or after a warm reset. This may prevent the error management system from taking appropriate corrective action.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Reliability, Availability, and Serviceability (RSA) and Functional Safety Architecture (FuSA) standards for automotive and industrial environments rely on robust error handling. Associated systems are expected to detect and signal system health conditions during warm reset stages and take corrective actions as desired. For example, in the event of an error, the system may operate in a degraded state to support non-stop operation and error administration. A central processing unit (CPU) employing machine check architecture (MCA) may not initiate error handling early enough in a corresponding bootstrapping sequence to meet such standards. For example, an MC bank may log instruction fetch unit (IFU) and data cache unit (DCU) errors during a boot sequence. However, such errors may not be signaled for error correction unit after a basic input output system (BIOS) system initializes control bits for the machine check system. Such control bits may be initialized relatively late in the bootstrapping sequence. Early process errors may impact the bootstrapping process, but corrective action may not be taken by the BIOS system as the BIOS system may be unaware when such errors occurred due to various warm resets in the bootstrapping process.

Disclosed herein are mechanisms to support improved system debugging, for example to support predictive failure analysis, error reporting, and implementation of corrective actions. A CPU package includes a system agent such as a power control unit (PCU) and/or a utility box (U-box). The system agent employs an error handler to detect system errors. When an error occurs during a bootstrap sequence prior to initialization of a MCA control system. The error may be logged in machine check (MC) banks. The system agent initiates a wide pulse event as part of catastrophic error (CATERR#) signaling. The wide pulse event is received by a wide pulse register and a lap register. The wide pulse register may log a wide pulse time stamp counter value (e.g. a timestamp) upon receiving the wide pulse event. The lap register may be configured as a counter, and may store/initialize a lap time stamp counter value (e.g. a counter) upon receiving the wide pulse event. The wide pulse register is designed to maintain a value across a warm reset, while the lap time register is designed to reset to a zero value across a system reset. Accordingly, once the MCA control system is initialized, the values from the wide pulse register and the lap register may be obtained (e.g. by the system agent) an examined. When a zero value is stored in the lap register and a non-zero value stored in the wide pulse register, an error occurred prior to a warm reset. When a non-zero value is stored in both the wide pulse register and the lap register, an error occurred after the warm reset. Such information may be passed along to the BIOS, an operating system (OS), a baseboard management controller (BMC), or other control system for error management for predictive failure analysis and/or implementation of corrective actions. For increased customization, the system agent may include a programmable whitelist. The whitelist may contain information indicating error types that qualify for initiation of the wide pulse event. As such, the pre-MCA error logging can be controlled by changing data in the whitelist.

Figure 1:
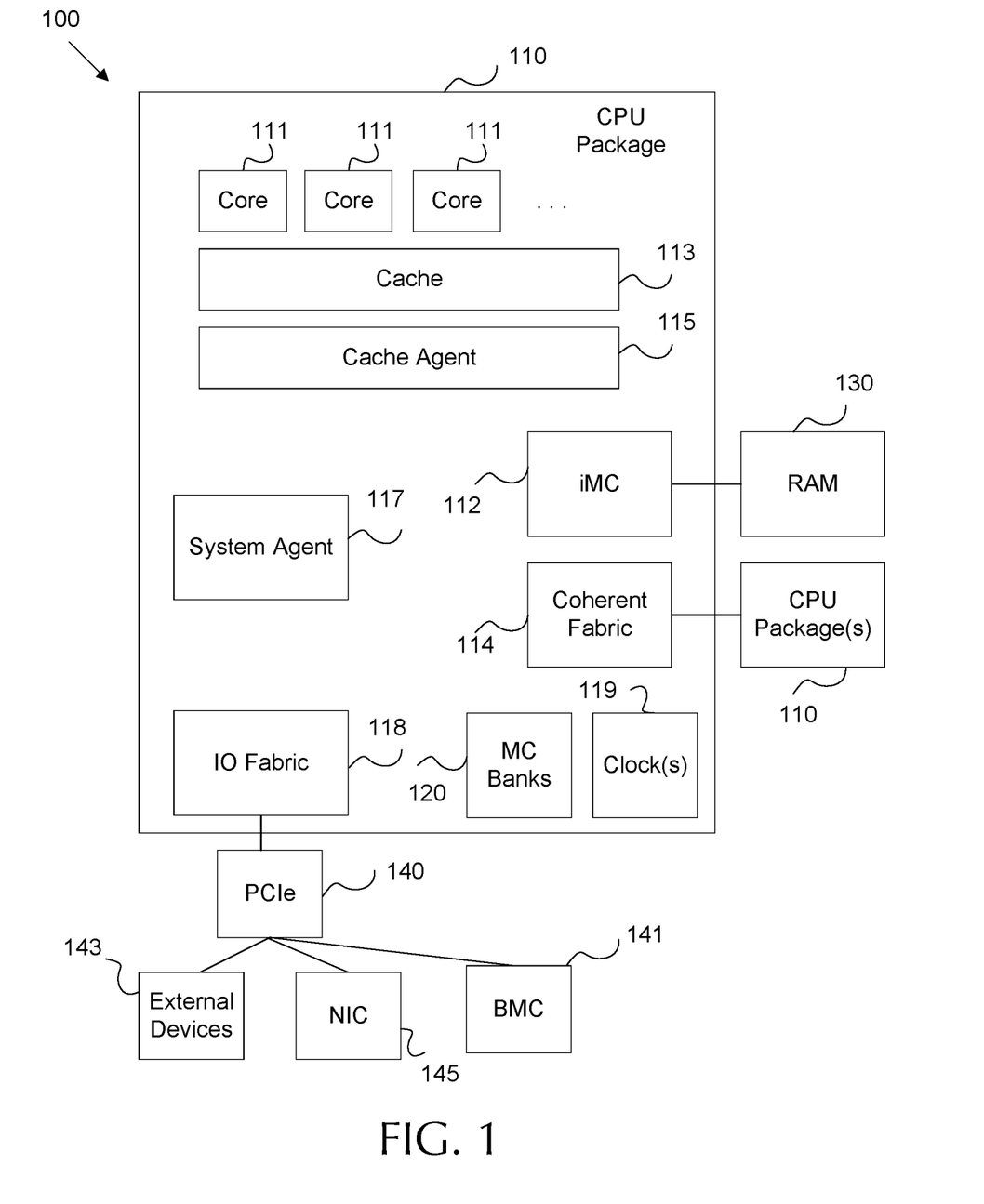
FIG. 1 is a block diagram of an embodiment of a central processing unit (CPU) system implemented according to a machine check (MC) architecture.

FIG. 1 is a block diagram of an embodiment of a central processing unit (CPU) system 100 implemented according to a machine check (MC) architecture. System 100 includes a CPU package 110. A CPU package 110 is a structural unit configured to contain one or more processor dies containing CPU cores 111 and electrically couple the CPU cores 111 to other components. The CPU package 110 may comprise semiconductor material, conductive contacts (e.g. made of gold), and a sealing compound to prevent damage to components.

Cores 111 are general purpose processing units including transistors embedded into semi-conductive material, each known as a processor die. The cores 111 are configured to execute instructions by operation of the transistors. For example, the core 111 communicate with the other components to obtain data. The cores 111 forward the data through a corresponding transistor network to process the data, for example via execution of corresponding instructions. The processed data and/or the results of the execution may then be stored back in memory.

The CPU package 110 may include many components to support the execution of instructions by the cores 111. For example, the CPU package 110 may include a cache 113, one or more cache agents 115, a system agent 117, an integrated memory controller (iMC) 112, a coherent fabric 114, one or more clocks 119, a plurality of MC banks 120, and an input output (IO) fabric 118. It should be noted that the list of CPU package 110 components discussed herein in exemplary and simplified for purposes of clarity of discussion. Package 110 may include many other special purpose components, and some of the components disclosed herein may be omitted without departing from the present disclosure. Further, the components are electrically coupled as desired to perform their respective functions. Specific couplings are not depicted in order to simplify and enhance the clarity of the disclosed examples.

Cache 113 is any memory positioned in close proximity to the cores 111 to increase access speed during processing. Cache 113 may include a plurality of cache units, configured in layers, to support corresponding groups of cores 111. For example, each core 111 may include a local cache, which may be referred to as a layer one cache. A layer two cache, also known as a mid-level cache, may support a plurality of cores 111. Further, a last level cache may be shared by all of the cores 111 on package 110. Cache 113 stores data for cores 111 and promote data sharing between cores 111 during multi-core execution of a common process. Cache 113 is configured to receive, store, and return data to cores 111 on command.

Caches 113 are managed by a cache agent 115, which is any device configured to manage cache 113 memory and/or system 100 access on behalf of the cores 111. In some embodiments, caches 113 are configured to act in a coherent fashion. In a coherent cache configuration, multiple caches 113 store the same data in different locations for use by different cores 111. Coherence indicates the data maintained consistently, such that a change to data in a first location results in corresponding data in another location being altered or discarded accordingly. Cache agent 115 may be configured to maintain cache coherence between a plurality of caches 113, in which case the cache agent 115 may be referred to as a coherence engine (C-Box). Cache agent 115 may also act as a system interface (S-Box) between the caches 113 and the other components. Cache agent 115 may also comprise a router (R-Box) for routing data packets between the cores 111 (e.g. via the S-Box) and the other components.

Cores 111 often operate on data that is too large to exist completely on cache 113. Accordingly, CPU package 110 is coupled to random access memory (RAM) 130. RAM is short term memory positioned off of the CPU package 110. RAM 130 holds more data than cache 113, but is positioned farther away from the cores 111 than cache 113. Hence, RAM 130 has a slower access time than cache 113. For example, an application and/or an active application function may be stored in RAM 130. Portions of the active application functions are communicated from RAM 130 to cache 113, and vice versa, on an as needed basis, which allows the cores 111 to operate on data stored in the faster cache 113 system. iMC 112 acts as a memory controller (M-Box), and functions as an interface between RAM 130 and caches 113 (e.g. via cache agent 115). For example, iMC 112 may translate read and write commands (e.g. from cores 111/cache agent 115) into specific memory commands, and schedule such commands based on memory timing to support communication between RAM 130 and the other components.

CPU package 110 is configured to communicate with a plurality of other CPU packages 110, each with corresponding cores 111 and other components. Accordingly, CPU packages 110 can operate together to apply a large number of cores 111 to execute applications and perform other processing tasks. CPU packages 110 are interconnected via the coherent fabric 114. Coherent fabric 114 is a CPU package 110 interconnect configured to communicate data between CPU packages 110 while maintaining data coherence between caches 113 located on separate CPU packages 110. For example, coherent fabric 114 may include a plurality of conductive traces for communication as well as a controller to maintain coherence. Accordingly, coherent fabric 114 communication supports cross package 110 application of a plurality of cores 111 to a common process (e.g. multi-threading). CPU package 110 may also contain additional communication fabrics as needed, for example a direct media interface (DMI), etc.

CPU package 110 components operate based on one or more clock signals. For example, hardware components may perform actions by transitioning between states. Such state transitions may occur based on clock signals. Such clock signals are provided via one or more signal clocks 119. A clock 119 is a circuit/signal generator that emits a clock signal that oscillates in a regular pattern between a predefined high amplitude value and a predefined low amplitude value at a specified frequency.

CPU Package 110 communicates with external components via IO fabric 118. IO fabric 118 includes a plurality of electrically conductive traces and may include one or more controllers to manage communications. In some embodiments, the package 110 employs IO fabric 118 to communicate with external components via a Peripheral Component Interconnect Express (PCIe) communication protocol. For example, package 110 may be positioned on a circuit board (e.g. motherboard) that includes a PCIe bus 140. PCIe bus 140 is a high speed serial computer expansion bus configured to communicate data between IO fabric 118 and a plurality of external devices 143. External devices 143 may be any hardware devices positioned in a computing environment and configured to support computation by the cores 111. For example, external devices 143 may include external hard drives for long term storage, video processing cards, etc. Specifically, PCIe bus 140 may be employed to communicate with external devices such as a network interface controller (NIC) 145 and a baseboard management controller (BMC) 141. NIC 145 is a network interface device employed to communicate data between system 100 and other devices over a network, such as a local area network (LAN), wide area network (WAN), data center network, cloud network, the Internet, etc. The BMC 141 is a specialized low power service processor that monitors the physical state of system 100. For example, BMC 141 may monitor and store internal physical variables such as temperature, humidity, power-supply voltage, fan speeds, communication parameters, OS functions, etc. The BMC 141 may also initiate hardware changes, such as rebooting a system, and report system status to a remote administrator on command. The BMC 141 may be positioned on a motherboard adjacent to CPU packages 110.

MC banks 120 are a plurality of registers configured to store data upon occurrence of an error. Each MC bank 120 is configured to store error data upon occurrence of an error in one or more corresponding components as machine check errors. In other words, each component is associated with an MC bank 120, but some MC banks 120 may store error data for more than one components. MC banks 120 are employed to detect, store, and report hardware errors to a BIOS, to a local OS, to the BMC 141, and/or over a network via the NIC 145. Errors may occur for many reasons. For example, errors may occur due to hardware/software timeouts, damaged memory sectors, improper system configuration, improper voltage levels due to a damaged power supply, damaged parts, faulty optimization instructions, faulty power management instructions, etc. The MC banks 120 store an address of hardware that produced the error, data describing the error, whether the error was recoverable (e.g. whether the error requires a reboot), etc. In some examples, the MC banks 120 are also configured to store a timestamp, based on the clock signal from the clocks 119. The error data in the MC banks 120 may be used by the OS, system firmware, the cores 111, the BMC 141, and/or a network administrator via the NIC 145 to determine error causes, to initiate corrective action, and/or failure prediction analysis. However, as noted above, the control systems for the MC banks 120 may not be initialized until relatively late in the bootstrapping processing. As such, the error data logged in the MC banks 120 may not be directly available to the system 100 during the early stages of bootstrapping.

System agent 117 is a system configuration controller. In some cases, the system agent 117 may be implemented as a PCU. In some cases, the system agent 117 may be implemented as a U-box. The system agent 117 includes counter (s) and global state registers, and is configured to monitor and store events occurring on CPU package 110. For example, the system agent 117 may be designed to employ registers to track errors occurring during the bootstrapping process and prior initialization of the control system for the MC banks 120. For example, the system agent 117 may initiate a wide pulse event upon detection of the error between initiation of a bootstrapping sequence and initiation of a machine check system controlling the MC banks 120. The wide pulse event may initialize registers with values that can be employed to determine whether the error occurred prior a warm reset or after a warm reset, as discussed in greater detail below.

Figure 2:
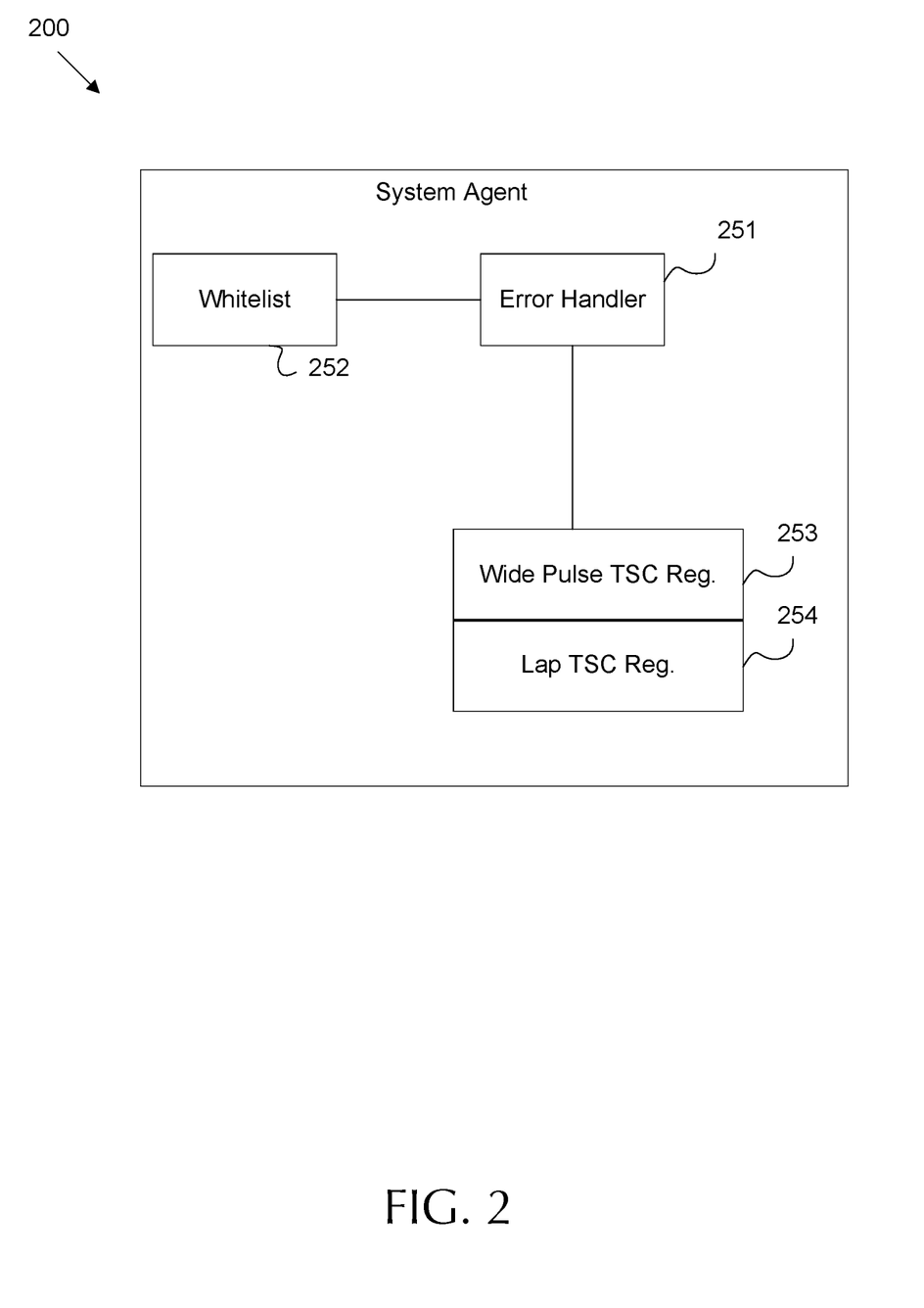
FIG. 2 is a block diagram of an embodiment of a system agent for handling exceptions prior to initiation of MC banks.

FIG. 2 is a block diagram of an embodiment of a system agent 200 for handling exceptions prior to initiation of MC banks, such as MC banks 120. For example, system agent 200 may be a particular implementation of a system agent 117 in a processor package, such as CPU package 110. As another example, system agent 200 may be implemented on other processor packages, such as a graphics processing unit (GPU), network processor, application specific circuit, a processor in an automotive and/or industrial system, etc. System agent 200 includes an error handler 251, memory containing a whitelist 252, a wide pulse time stamp counter (TSC) register 253, and a lap TSC register 254.

The error handler 251 is circuitry designed to monitor for system errors and take corresponding actions. For example, the error handler 251 may detect an error occurring during bootstrapping of the processor package. In such a case, the error handler 251 may perform various signaling. For example, the error handler 251 may be designed to perform CATERR# signaling upon detecting an error. While CATERR# signaling may be employed to signal a catastrophic error (e.g. an error that is only correctable by a system restart), CATERR# may also be extended to non-fatal machine check errors. When an error is detected between initiation of a bootstrapping sequence and initiation of a machine check system, the error handler 251 may cause the system agent 200 to initiate a wide pulse event. For example, the wide pulse event may be a CATERR# signal transmitted to the wide pulse TSC register 253 and the lap TSC register 254. The wide pulse event signals the wide pulse TSC register 253 to store a wide pulse time stamp counter value to indicate an occurrence of the error during bootstrapping. The wide pulse event also signals the lap TSC register 254 to store a lap time stamp counter value to indicate an occurrence of the error.

The wide pulse TSC register 253 is a memory unit that stores a current wide pulse time stamp counter value upon receiving the wide pulse event to indicate an occurrence of an error during bootstrapping. The wide pulse TSC register 253 maintains the wide pulse time stamp counter value during a warm reset. The wide pulse time stamp counter value may include a time stamp indicating a system time associated with the occurrence of the error (e.g. the error that caused the wide pulse event signal). The wide pulse TSC register 253 may be a sixty four bit register. The wide pulse TSC register 253 may reset to a zero value upon cold reset.

The lap TSC register 254 is a memory unit that stores a lap time stamp counter value upon receiving the wide pulse event to indicate an occurrence of an error during bootstrapping. The lap TSC register 254 may be a sixty four bit register. Unlike the wide pulse TSC register 253, the lap TSC register 254 clears the lap time stamp counter value during a warm reset (and on cold reset). The lap time stamp counter value may include a counter value that indicates a number of cycles since the occurrence of the error. In other words, the value stored in the lap TSC register 254 may be initialized to zero upon receiving power. Upon receiving a wide pulse event, the lap time stamp counter value may begin incrementing, for example every clock cycle. When the system performs a warm reset, the lap time stamp counter value is then reset to zero. It should be noted that the lap TSC register 254 may only be incremented when the wide pulse register TSC 253 is updated.

By employing the wide pulse TSC register 253 and the lap TSC register 254, an error testing/debugging entity may determine whether an error occurred before or after a warm reset even when the MCA system has not yet been initialized. For example, when a zero value is stored in the lap register and a non-zero value is stored in the wide pulse register, the values collectively indicate the error occurred prior to the warm reset. As another example, when a non-zero value is stored in both the wide pulse TSC register 253 and the lap TSC register 254, the values collectively indicate that the error occurred after the warm reset. Further, a zero value in both the wide pulse TSC register 253 and the lap TSC register 254 may indicate that no error occurred. The error testing/debugging entity may check the MC banks (e.g. MC banks 120) for further information indicating which error occurred. This is because the MC banks may log error data even when the MCA control system has not been initialized. It should be noted that in some cases the additional registers may also include data indicating the particular error that occurred. For example, shadow registers in a separate shadow area may be employed to shadow the MC banks to provide additional access to relevant error data (e.g. in case error reported is desired before the MCA is initialized).

The whitelist 252 is a programmable memory unit that indicates error types which qualify for initiation of the wide pulse event. As such, software systems, such as the BIOS/OS, or other testing/debugging systems can direct the system agent to turn pre-MCA initiation error handling on or off for particular error types as desired. The whitelist 252 may be set to initiate wide pulse events upon encountering an error listed in an external design specification (EDS) and/or listed in a specification specific to the processor package.

In some examples, testing/debugging systems may read data directly from the wide pulse TSC register 253 and the lap TSC register 254. In some examples, the system agent 200 may report errors to the testing/debugging systems. For example, the system agent 200 may report the lap time stamp counter value and the wide pulse time stamp counter value to a BMC, a BIOS, an OS, or combinations thereof, to determine an order of the error relative to a warm reset. In other words, the system agent 200 may report a zero value stored in the lap TSC register 254 and a non-zero value stored in the wide pulse register 253 to indicate the error occurred prior to the warm reset. The system agent 200 may also report a non-zero value stored in both the wide pulse TSC register 253 and the lap TSC register 254 to indicate the error occurred after the warm reset. By employing the data in the wide pulse TSC register 253 and the lap TSC register 254, the system includes a mechanism to signal an error, occurring in the early stage of bootstrapping, across a network in a datacenter environment. Such data may be employed by a predictive failure algorithm to isolate particular hardware, such as a particular processor core. This can be employed with Built in Self Test) BIST, which may clear the mid-level and last level cache before a board support package (BSP) is bootstrapped. Further, this data supports signaling of errors in any point of the system flow instead of only for catastrophic and post MC initiated errors. Further, the data from the wide pulse TSC register 253 and the lap TSC register 254 allow software and/or management entities to determine which stage of the bootstrap created the error condition. The data also supports error harvesting, for example via the BMC, which may be employed to refined predictive failure algorithms operating on the system. Further, the data allows the BIOS to determine a time of the error an inform the OS, for example via an advanced configuration and power interface (ACPI).

Figure 3A:
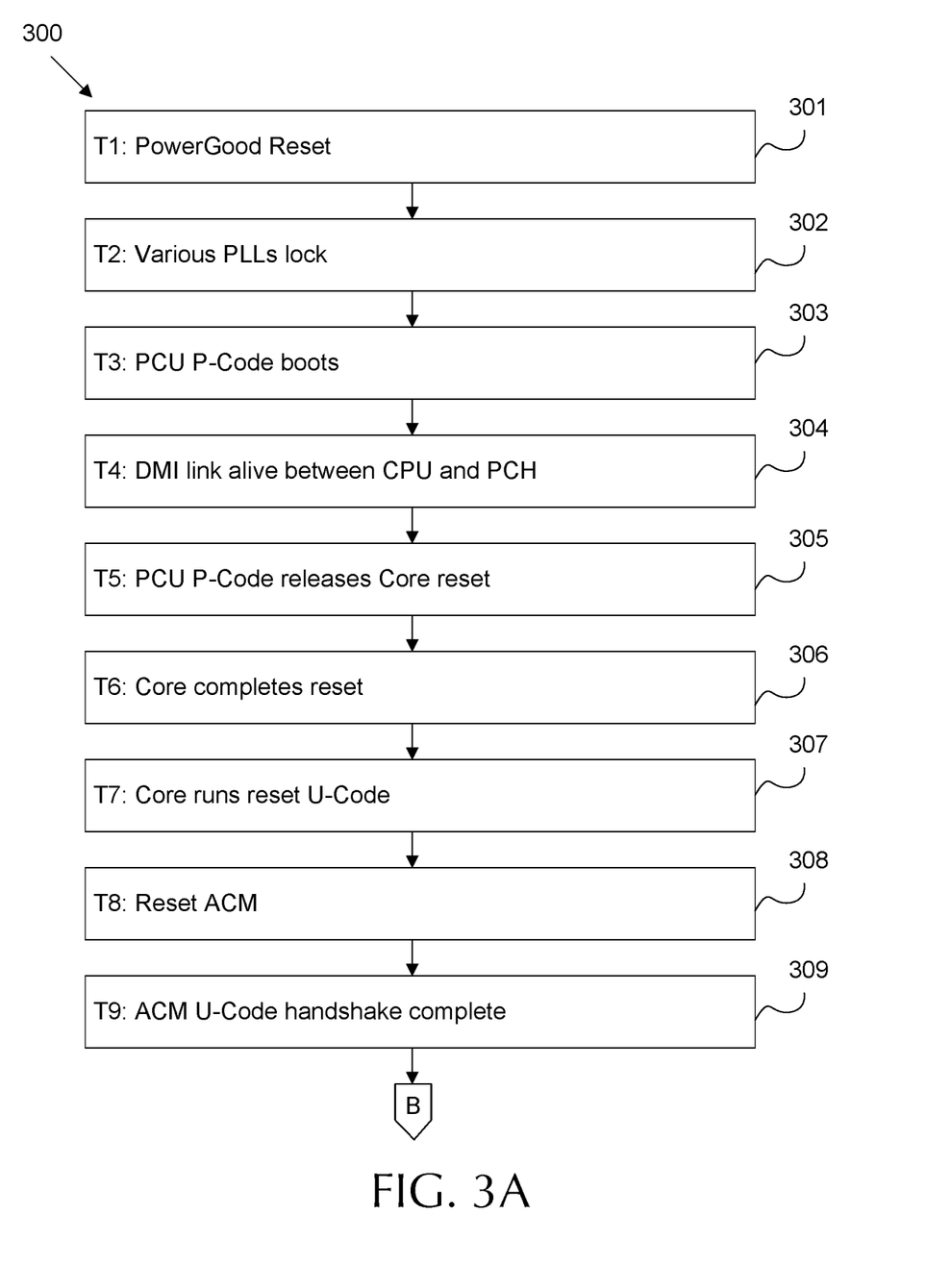
FIGS. 3A-3C are a flowchart of an example bootstrapping sequence.
Figure 3B:
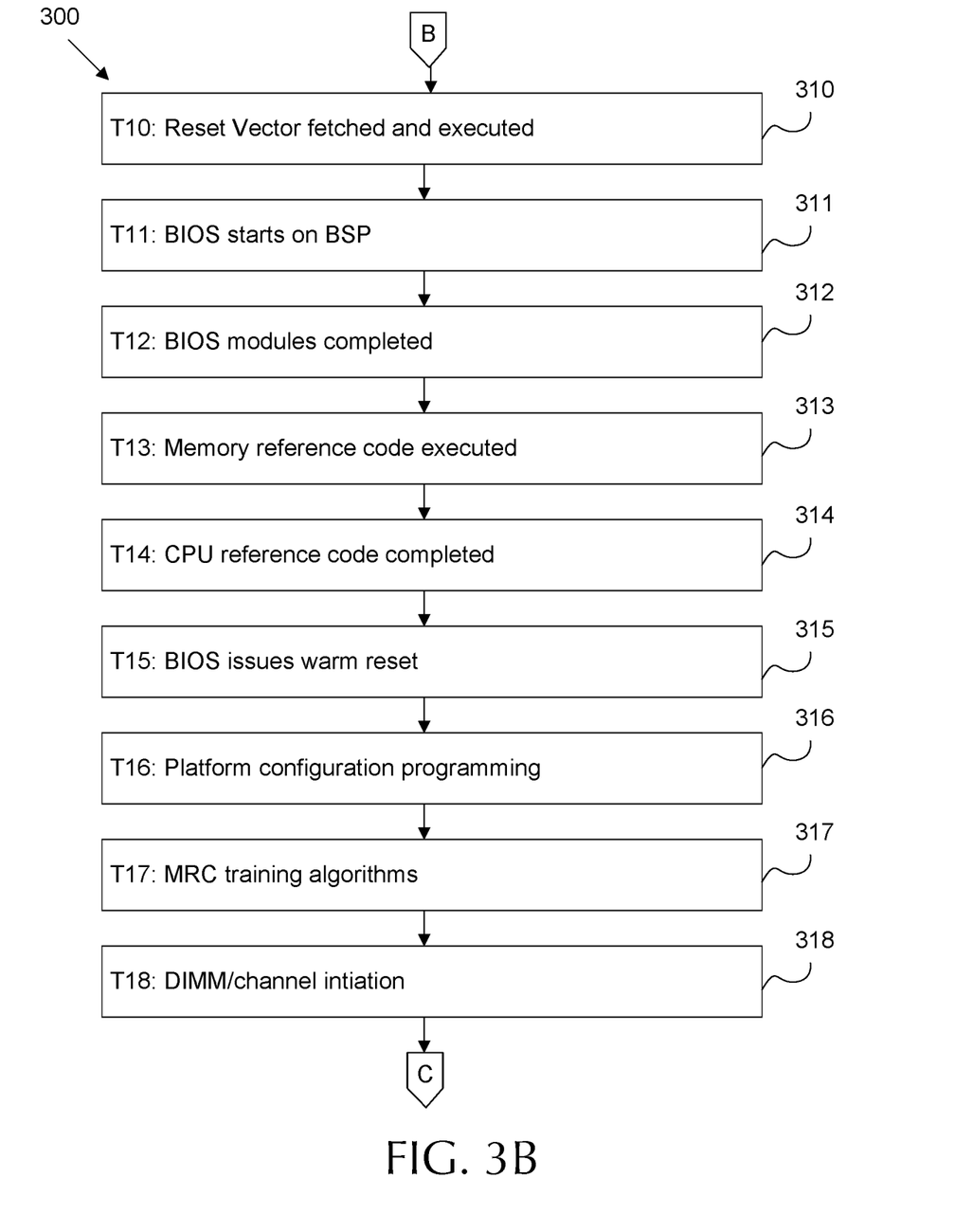
Figure 3C:
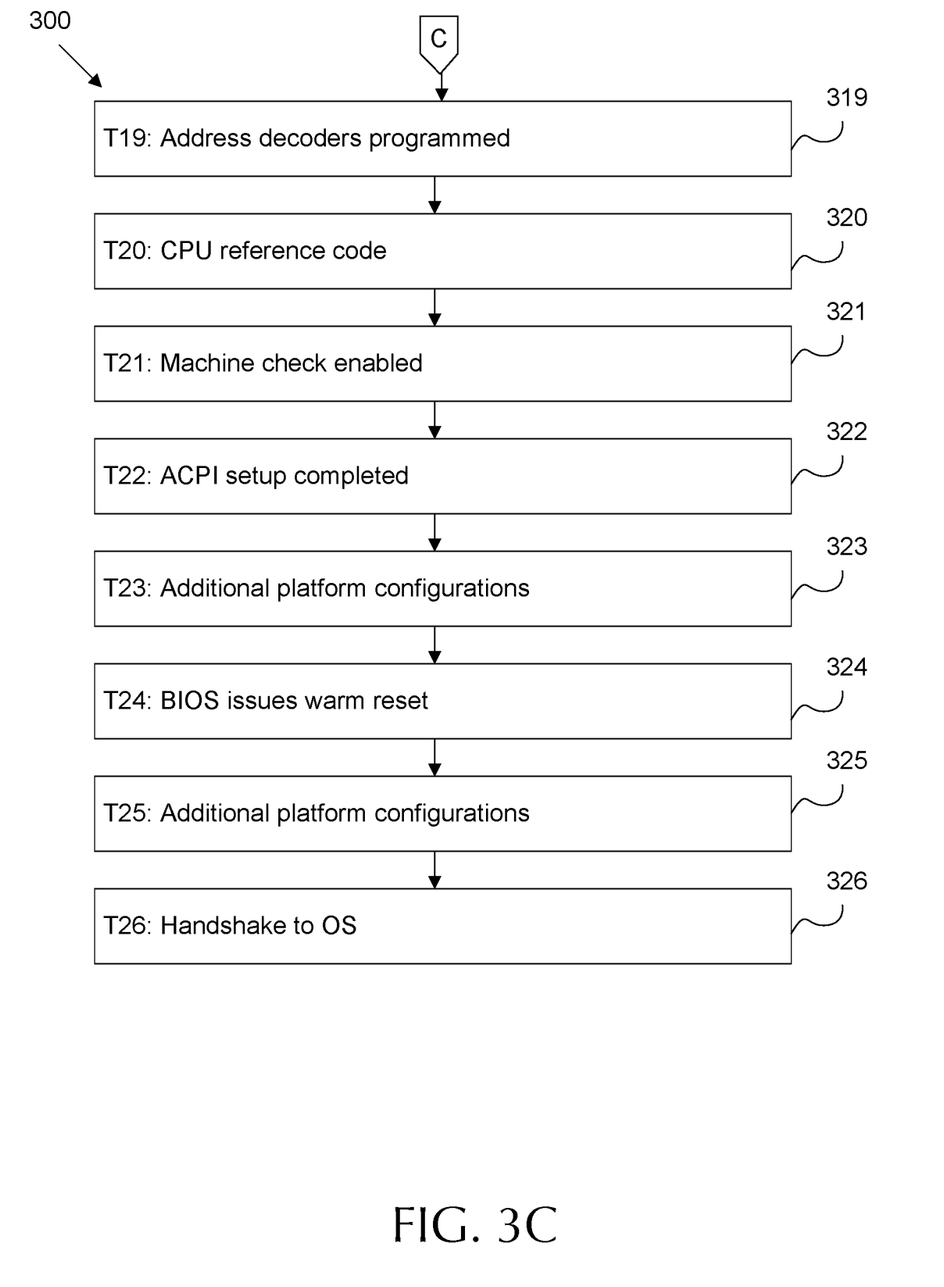

FIGS. 3A-3C are a flowchart of an example bootstrapping sequence 300 that may be employed by a processor package, such as a CPU package 110 employing a system agent 117 and/or 200. The bootstrapping sequence 300 is an example of a general startup sequence, and is presented to provide a specific example of the benefits of the disclosed mechanisms.

At block 301, the sequence initiates a PowerGood reset. The PowerGood reset indicates that voltage levels supplied to the CPU package are at appropriate levels for safe operation. At block 302, various phase lock loops (PLLS) lock causing CPU circuits to begin managing electrical signals. At block 303, a power control unit (PCU) initiates internal power (P) codes to begin managing power for the CPU. Additional micro-controllers may also become operational, begin fetching operational codes, begin initializing communication interfaces, etc. At block 304, a direct media interface (DMI) link is activated between the CPU and a platform controller hub. At block 305, the PCU's P-codes release the PCU core(s) to be reset to update based on the setting changes occurring in blocks 301-304.

At block 306, the core(s) complete a reset and begin operating on the updated code (U-code) settings post reset at block 307. At block 308, an authenticated control module (ACM) is reset, allowing an ACM u-code handshake to occur at block 309 to initiate communication between the core(s) and the ACM. At block 310, a reset vector is fetched and initiated allowing the BIOS to initiate on the board support package (BSP) at block 311. At block 312, the BIOS modules are completely executed. Memory reference code is executed at block 313. At block 314, the CPU's reference code is completed, indicating that the CPU package hardware (e.g. memory, process circuits, circuit interfaces/links, etc.) is initialized and ready for full control by the BIOS.

At block 315, the BIOS issues a warm reset to cause the CPU package components to update based on the setting changes occurring in blocks 306 through 314. Then the BIOS is prepared to take control of systems off of the CPU package. At block 316, the platform initiates other configuration programming. At block 317, memory initialization reference code (MRC) training algorithms are employed to prior to dual inline memory module (DIMM)/channel initiation to take control of CPU random access memory (RAM) at block 318. Address decoders are programmed at block 319 to allow the CPU to address memory locations correctly. The CPU then executes additional reference codes at blocks 320 (e.g. to initialize additional cores in a multi-core CPU system).

At block 321, the machine check architecture is completely enabled, allowing full error logging by the CPU. At block 322, an advance configuration and power interface (ACPI) setup is completed, including reporting the enablement of the machine check architecture to the OS. Additional platform configurations may also be completed at block 323. At block 324, the BIOS may issue a warm reset, for example to update based on the setting changes occurring in blocks 315 through 323 as desired. At block 325, further additional platform configurations may be performed prior to performing a handshake to the OS at block 326. After the OS handshake, the OS obtains control of the hardware.

As can be seen by the discussion above, a boot sequence, such as boot sequence 300 can be quite complex, can employ several warm resets, and can generate errors at many possible points. Further, the machine check architecture is not fully enabled until block 321. Without the wide pulse event disclosed herein, error signaling is turned off prior to block 321. Errors may be logged (e.g. in the MC banks), but the firmware may be unable to harvest such errors. Further, while errors may be signaled by the machine check architecture between initiation at block 321 and handshake with the OS at block 326, the system may be unable to differentiate whether such errors occurred before or after the warm reset of block 324. As such, the system may have difficulty determining if the error occurred in block 323 or block 325. Warm resets, such as block 324, may relate to multiple functional units an system configurations changes. Hence, such a warm reset has a relatively high potential area for errors/glitches. In the event that the OS resets for a patch load or other update, machine check harvesting may be employed to determine the source of the error. Further, the BIOS may employ such machine check harvesting to disambiguate the nature of the error.

By employing the disclosed mechanisms, the CPU may log errors at any stage of the boot sequence and may disambiguate to determine when such errors occurred relative to a warm reset. Specifically, the wide pulse event may initialize the wide pulse TSC register and the lap TSC register to a value even when the machine check architecture is not active (e.g. prior to block 321). Further, since the lap TSC register clears on warm reset and the wide pulse TSC does not, the system can compare the values to determine whether an error occurred before or after a warm reset (e.g. at block 324). For example, if both registers include non-zero values, then the error occurred after block 324 (e.g. at block 325). As a further example, if the wide pulse TSC contains a value and the lap TSC contains a zero value, then the error occurred prior to the warm reset (e.g. at block 323).

Figure 4:
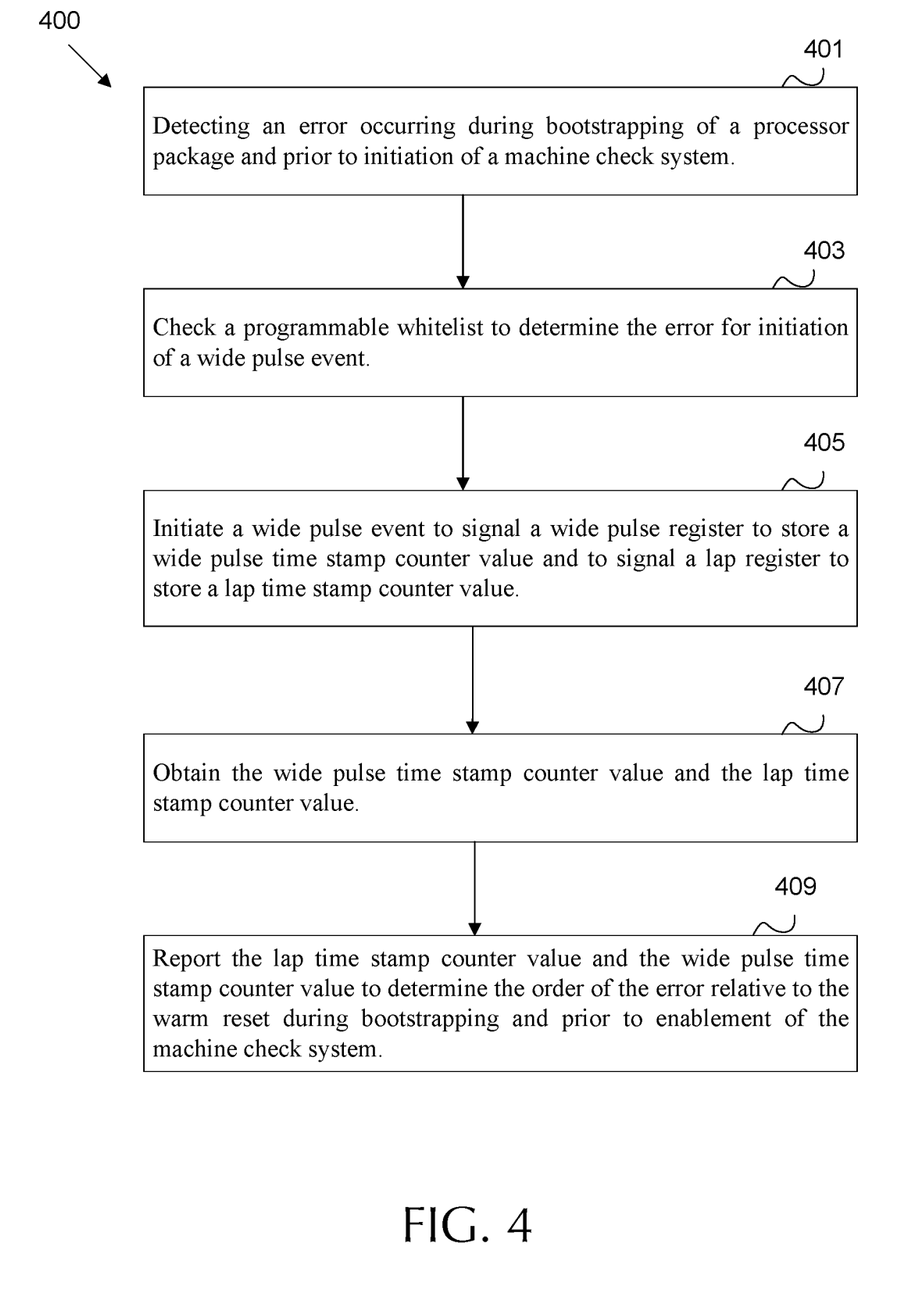
FIG. 4 is a flowchart of an embodiment of a method for disambiguation of error logging during a warm reset.

FIG. 4 is a flowchart of an embodiment of a method 400 for disambiguation of error logging during a warm reset. For example, method 400 can be employed on a processor package, such as a CPU package 110 employing a system agent 117 and/or 200 to run a bootstrapping sequence such as bootstrapping sequence 300. The system agent operating method 400 may be, for example a U-box and/or a PCU.

At block 401, an error occurring during bootstrapping of a processor package is detected, for example by a system agent. The error may occur prior to initiation of a machine check system. At block 403, the system agent may check a programmable whitelist to determine that the error is of an error type which qualifies for initiation of the wide pulse event. Upon determination that the error qualifies for a wide pulse, the method 400 proceeds to block 405.

At block 405, a wide pulse event is initiated to signal a wide pulse register to store a wide pulse time stamp counter value. The wide pulse event also signals a lap register to store a lap time stamp counter value. As noted above, the wide pulse register maintains the wide pulse time stamp counter value during a warm reset. Further, the lap register clears the lap time stamp counter value during a warm reset. The wide pulse event may be employed when the machine check architecture is not enabled. The wide pulse event may be implemented in the system agent and/or in any hardware block that managers CATERR# signaling. For example, the wide pulse event may be an extension of the CATERR# signaling where the wide pulse is output on a machine check log entry. The wide pulse may be 32 blocks by default. The duration of the wide pulse may be programmable (e.g. via the whitelist). In some cases, the wide pulse duration may be stored in a register to facilitate programming. The At block 407, the wide pulse time stamp counter value and the lap time stamp counter value are obtained. These values may be employed for determination of an order of occurrence of the error relative to the warm reset. For example, when a zero value is stored in the lap register and a non-zero value is stored in the wide pulse register, the registers indicate the error occurred prior to the warm reset. As another example when a non-zero value is stored in both the wide pulse register and the lap register, the registers indicate the error occurred after the warm reset. The wide pulse time stamp counter value may include a time stamp indicating a system time associated with an occurrence of the error. Further, the lap time stamp counter value may include a counter value indicating a number of cycles since an occurrence of the error.

At optional block 409, the lap time stamp counter value and the wide pulse time stamp counter value may be reported (e.g. by the system agent) to a relevant control system. For example, the values may be reported to a BMC, a BIOS, an OS, or combinations thereof. Such reporting my support determination of the order of the error relative to the warm reset during bootstrapping and prior to the enablement of the machine check system.

Stated another way, the system may start from a cold reset, and hence the wide pulse register and the lap register may include a value of 0x0. On error log to a machine check bank, the system logic may read the system time stamp counter(s) and update the wide pulse register accordingly. He hardware logic may optionally shadow the machine check bank in a separate shadow register area. As a wide pulse register has been updated, the lap register may begin incrementing with the periodicity of the system time stamp counter. The system software, firmware, and/or BMC can read the registers and determine whether the error was a pre or post warm reset error. If no error occurs, the system may continue to check for errors.

Pre or post error determination may occur after an error has occurred. Warm resets clear the lap register, but the wide pulse register is sticky across a warm reset. If the wide pulse register contains a non-zero value and the lap register contains a zero value, then a pre-reset error was logged. If the wide pulse register contains a non-zero value and the lap register contains a value greater than zero, then a post-reset error was logged and the value of the lap register indicates a duration since the error.

By employing the disclosed mechanisms the system can determine and signal errors, for example in a data center environment, without requiring a corresponding component be removed from service and taken to a lab for debugging. This may occur, for example, when a machine encounters an error by a BSP core is active to execute BIOS code, which leads to a system reset. Further, when a machine encounters an error for an application processor (AP) a predictive failure algorithm can be employed to isolate corresponding processor core. Errors may be signaled at any point of a system flow as opposed to either catastrophic or post MC cases. Further, software and/or management entities are provided with knowledge of which particular stage created an error condition. Also, in a data center environment, the disclosed mechanisms may be employed to pin point a specific workload being executed during an error. This is because time stamping associated with the error (in a multi-tenant case) is available in the wide pulse register. In addition, the mechanism increases the effectiveness of predictive failure algorithms as error harvesting can be completed via a BMC and/or other management entity (ME). Further, the mechanism increases the scope of BIOS ability to inform the OS (e.g. via the ACPI) of errors, as the BIOS can determine the time of the error.

EXAMPLES

Illustrative examples of the technologies disclosed herein are provided below. An embodiment of the technologies may include any one or more, and any combination of, the examples described below.

Example 1 includes a processor package for disambiguation of error logging during a warm reset, the package comprising: a wide pulse register to store a wide pulse time stamp counter value upon receiving a wide pulse event that indicates an occurrence of an error during bootstrapping, and to maintain the wide pulse time stamp counter value during a warm reset; and a lap register to store a lap time stamp counter value upon receiving the wide pulse event, and to clear the lap time stamp counter value during the warm reset.

Example 2 includes the processor package of Example 1, in which a zero value stored in the lap register and a non-zero value stored in the wide pulse register indicate the error occurred prior to the warm reset.

Example 3 includes the processor package of Example 1, in which a non-zero value stored in both the wide pulse register and the lap register indicate the error occurred after the warm reset.

Example 4 includes the processor package of Examples 1-3, in which the wide pulse time stamp counter value includes a time stamp indicating a system time associated with the occurrence of the error.

Example 5 includes the processor package of Examples 1-4, in which the lap time stamp counter value includes a counter value indicating a number of cycles since the occurrence of the error.

Example 6 includes the processor package of Examples 1-5, further comprising a system agent coupled to the wide pulse register and the lap register, the system agent to initiate the wide pulse event upon detecting the error during bootstrapping.

Example 7 includes the processor package of Examples 1-6, further comprising a machine check bank to store machine check errors, in which the system agent initiates the wide pulse event between initiation of the bootstrapping sequence and machine check initiation.

Example 8 includes the processor package of Examples 6-7, in which the system agent includes a programmable whitelist that indicates error types which qualify for initiation of the wide pulse event.

Example 9 includes the processor package of Examples 6-8, in which the system agent is a PCU.

Example 10 includes the processor package of Examples 6-8, in which the system agent is a U-box.

Example 11 includes a processor package for disambiguation of error logging during a warm reset, the package comprising: a system agent to: detect an error occurring during bootstrapping of the processor package, and initiate a wide pulse event upon detection of the error between initiation of a bootstrapping sequence and initiation of a machine check system.

Example 12 includes the processor package of Example 11, in which the system agent includes a programmable whitelist that indicates error types which qualify for initiation of the wide pulse event.

Example 13 includes the processor package of Examples 11-12, in which the system agent is a PCU.

Example 14 includes the processor package of Examples 11-12, in which the system agent is a U-box.

Example 15 includes the processor package of Examples 11-14, in which the system agent initiates the wide pulse event by signaling a wide pulse register to store a wide pulse time stamp counter value to indicate an occurrence of the error during bootstrapping and to maintain the wide pulse time stamp counter value during a warm reset.

Example 16 includes the processor package of Examples 11-15, in which the system agent further initiates the wide pulse event by signaling a lap register to store a lap time stamp counter value to indicate an occurrence of the error and to clear the lap time stamp counter value during a warm reset.

Example 17 includes the processor package of Example 16, in which the system agent is further to report the lap time stamp counter value and the wide pulse time stamp counter value to a BMC, a BIOS, an OS, or combinations thereof, to determine an order of the error relative to the warm reset.

Example 18 includes the processor package of Examples 16-17, in which the system agent is further to report a zero value stored in the lap register and a non-zero value stored in the wide pulse register to indicate the error occurred prior to the warm reset.

Example 19 includes the processor package of Examples 16-17, in which the system agent is further to report a non-zero value stored in both the wide pulse register and the lap register to indicate the error occurred after the warm reset.

Example 20 includes a method for disambiguation of error logging during a warm reset, the method comprising: detecting, by a system agent, an error occurring during bootstrapping of a processor package and prior to initiation of a machine check system; initiating a wide pulse event to signal a wide pulse register to store a wide pulse time stamp counter value and to signal a lap register to store a lap time stamp counter value, the wide pulse register to maintain the wide pulse time stamp counter value during a warm reset and the lap register to clear the lap time stamp counter value during the warm reset; and obtaining the wide pulse time stamp counter value and the lap time stamp counter value for determination of an order of occurrence of the error relative to the warm reset.

Example 21 includes the method of Example 20, in which a zero value stored in the lap register and a non-zero value stored in the wide pulse register indicate the error occurred prior to the warm reset.

Example 22 includes the method of Example 20, in which a non-zero value stored in both the wide pulse register and the lap register indicate the error occurred after the warm reset.

Example 23 includes the method of Examples 20-22, in which the wide pulse time stamp counter value includes a time stamp indicating a system time associated with an occurrence of the error.

Example 24 includes the method of Examples 20-23, in which the lap time stamp counter value includes a counter value indicating a number of cycles since an occurrence of the error.

Example 25 includes the method of Examples 20-24, further comprising checking a programmable whitelist to determine the error is of an error type which qualifies for initiation of the wide pulse event.

Example 26 includes the method of Examples 20-25, further comprising reporting the lap time stamp counter value and the wide pulse time stamp counter value to a BMC, a BIOS, an OS, or combinations thereof, to determine the order of the error relative to the warm reset during bootstrapping.

Example 27 includes the method of Examples 20-26, in which the system agent is a PCU.

Example 28 includes the method of Examples 20-26, in which the system agent is a U-box.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments have been illustrated and described for purposes of illustration, it will be understood that various modifications may be made without departing from the spirit and scope of the present disclosure. Accordingly, the disclosure should not be limited except as by the appended claims.

We claim:

1. A processor package comprising:
a wide pulse register to store a wide pulse time stamp counter value upon receiving a wide pulse event that indicates an occurrence of an error during bootstrapping, and to maintain the wide pulse time stamp counter value during a warm reset; and
a lap register to store a lap time stamp counter value upon receiving the wide pulse event, and to clear the lap time stamp counter value during the warm reset.

2. The processor package of claim 1, in which a zero value stored in the lap register and a non-zero value stored in the wide pulse register indicate the error occurred prior to the warm reset.

3. The processor package of claim 1, in which a non-zero value stored in both the wide pulse register and the lap register indicate the error occurred after the warm reset.

4. The processor package of claim 1, in which the wide pulse time stamp counter value includes a time stamp indicating a system time associated with the occurrence of the error.

5. The processor package of claim 1, in which the lap time stamp counter value includes a counter value indicating a number of cycles since the occurrence of the error.

6. The processor package of claim 1, further comprising a system agent coupled to the wide pulse register and the lap register, the system agent to initiate the wide pulse event upon detecting the error during bootstrapping.

7. The processor package of claim 6, further comprising a machine check bank to store machine check errors, in which the system agent initiates the wide pulse event between initiation of the bootstrapping sequence and machine check initiation.

8. The processor package of claim 6, in which the system agent includes a programmable whitelist that indicates error types which qualify for initiation of the wide pulse event.

9. The processor package of claim 6, in which the system agent is a power control unit (PCU).

10. The processor package of claim 6, in which the system agent is a utility box (U-box).

11. A processor package comprising:
a system agent to:
detect an error occurring during bootstrapping of the processor package, and
initiate a wide pulse event upon detection of the error between initiation of a bootstrapping sequence and initiation of a machine check system.

12. The processor package of claim 11, in which the system agent includes a programmable whitelist that indicates error types which qualify for initiation of the wide pulse event.

13. The processor package of claim 11, in which the system agent initiates the wide pulse event by signaling a wide pulse register to store a wide pulse time stamp counter value to indicate an occurrence of the error during bootstrapping and to maintain the wide pulse time stamp counter value during a warm reset.

14. The processor package of claim 13, in which the system agent further initiates the wide pulse event by signaling a lap register to store a lap time stamp counter value to indicate an occurrence of the error and to clear the lap time stamp counter value during a warm reset.

15. The processor package of claim 14, in which the system agent is further to report the lap time stamp counter value and the wide pulse time stamp counter value to a baseboard management controller (BMC), a Basic input output system (BIOS), an operating system (OS), or combinations thereof, to determine an order of the error relative to the warm reset.

16. The processor package of claim 14, in which the system agent is further to report a zero value stored in the lap register and a non-zero value stored in the wide pulse register to indicate the error occurred prior to the warm reset.

17. The processor package of claims 14, in which the system agent is further to report a non-zero value stored in both the wide pulse register and the lap register to indicate the error occurred after the warm reset.

18. A method for disambiguation of error logging during a warm reset, the method comprising:
detecting, by a system agent, an error occurring during bootstrapping of a processor package and prior to initiation of a machine check system;
initiating a wide pulse event to signal a wide pulse register to store a wide pulse time stamp counter value and to signal a lap register to store a lap time stamp counter value, the wide pulse register to maintain the wide pulse time stamp counter value during a warm reset and the lap register to clear the lap time stamp counter value during the warm reset; and
obtaining the wide pulse time stamp counter value and the lap time stamp counter value for determination of an order of occurrence of the error relative to the warm reset.

19. The method of claim 18, in which a zero value stored in the lap register and a non-zero value stored in the wide pulse register indicate the error occurred prior to the warm reset.

20. The method of claim 18, in which a non-zero value stored in both the wide pulse register and the lap register indicate the error occurred after the warm reset.

21. The method of claim 18, in which the wide pulse time stamp counter value includes a time stamp indicating a system time associated with an occurrence of the error.

22. The method of claim 18, in which the lap time stamp counter value includes a counter value indicating a number of cycles since an occurrence of the error.

23. The method of claim 18, further comprising checking a programmable whitelist to determine the error is of an error type which qualifies for initiation of the wide pulse event.

24. The method of claim 18, further comprising reporting the lap time stamp counter value and the wide pulse time stamp counter value to a baseboard management controller (BMC), a Basic input output system (BIOS), an operating system (OS), or combinations thereof, to determine the order of the error relative to the warm reset during bootstrapping.

25. The method of claim 18, in which the system agent is a utility box (U-box).

\* \* \* \* \*